US010616563B2

(12) United States Patent
Taylor et al.

(10) Patent No.: US 10,616,563 B2
(45) Date of Patent: Apr. 7, 2020

(54) RECONFIGURABLE MULTI-MODE CAMERA

(71) Applicant: SONY INTERACTIVE ENTERTAINMENT INC., Tokyo (JP)

(72) Inventors: Michael G. Taylor, San Mateo, CA (US); Glenn T. Black, San Mateo, CA (US); Todd S. Tokubo, Newark, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 428 days.

(21) Appl. No.: 15/085,867

(22) Filed: Mar. 30, 2016

(65) Prior Publication Data

US 2017/0289527 A1    Oct. 5, 2017

(51) Int. Cl.
*H04N 13/289* (2018.01)
*H04N 13/243* (2018.01)
*H04N 13/239* (2018.01)
*H04N 5/247* (2006.01)

(52) U.S. Cl.
CPC ........... *H04N 13/289* (2018.05); *H04N 5/247* (2013.01); *H04N 13/239* (2018.05); *H04N 13/243* (2018.05); *H04N 2213/001* (2013.01); *H04N 2213/007* (2013.01)

(58) Field of Classification Search
CPC .... G02B 2027/0178; G02B 2027/0138; G02B 27/0176; G02B 2027/0134; G06T 19/006; H04N 13/239; H04N 5/23238; H04N 5/2254; H04N 5/2258; H04N 13/243; H04N 5/2253; H04N 5/2259; H04N 5/23296
See application file for complete search history.

(56) References Cited

U.S. PATENT DOCUMENTS

| 8,866,879 | B2 | 10/2014 | Seen et al. | |
|---|---|---|---|---|
| 2011/0128393 | A1* | 6/2011 | Tavi | H04N 5/2257 348/218.1 |
| 2012/0086786 | A1* | 4/2012 | Devigon | G03B 35/10 348/47 |
| 2012/0105579 | A1* | 5/2012 | Jeon | H04N 5/2258 348/38 |
| 2017/0111578 | A1* | 4/2017 | Eromaki | H04N 5/2258 |

FOREIGN PATENT DOCUMENTS

| CN | 102467341 A | 5/2012 |
|---|---|---|
| EP | 2966863 A1 | 1/2016 |
| TW | 201610471 A | 3/2016 |

* cited by examiner

*Primary Examiner* — Farhan Mahmud
(74) *Attorney, Agent, or Firm* — Kilpatrick Townsend & Stockton LLP

(57) ABSTRACT

A reconfigurable imaging apparatus, a computer-implemented method, and an imaging system are described. Generally, the apparatus includes platforms. Each platform houses one or more optical sensors. A pivotal connector is connected with at least two platforms and supports a relative movement of such platforms with respect to one another. Hence, the platforms can be arranged and switched between different arrangements based on the pivotal connector, thereby allowing a reconfiguration of the apparatus. In an example, arrangement, the optical sensors are pointed in different directions to cover different fields of views, thereby supporting monoscopic imagery. In another example arrangement, the optical sensors are pointed in substantially a same direction to cover substantially a same field of view, thereby supporting stereoscopic imagery.

20 Claims, 8 Drawing Sheets

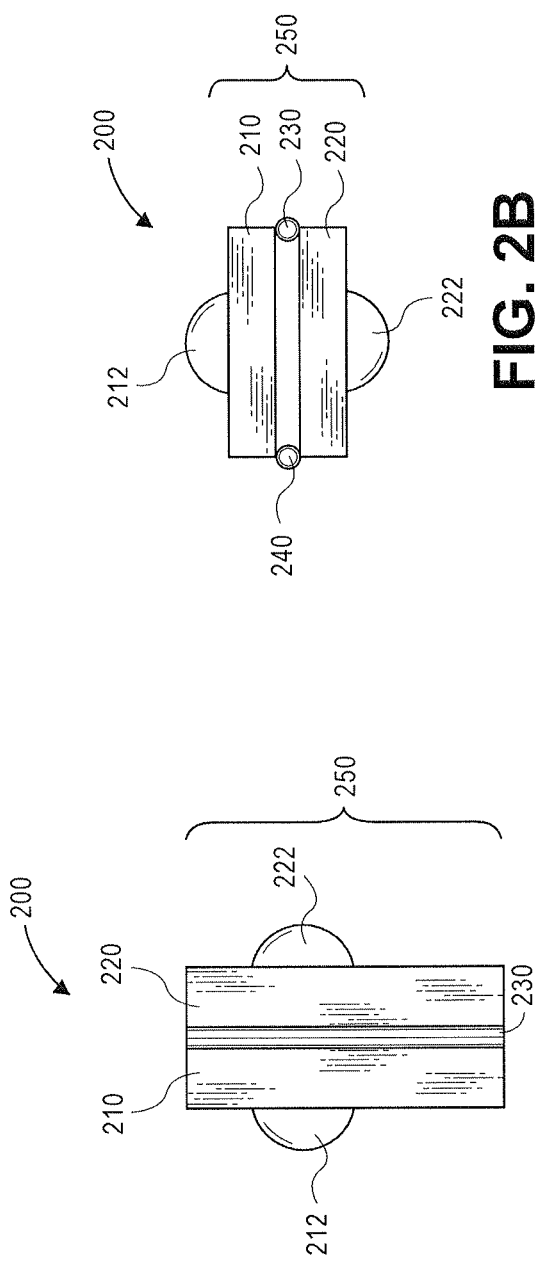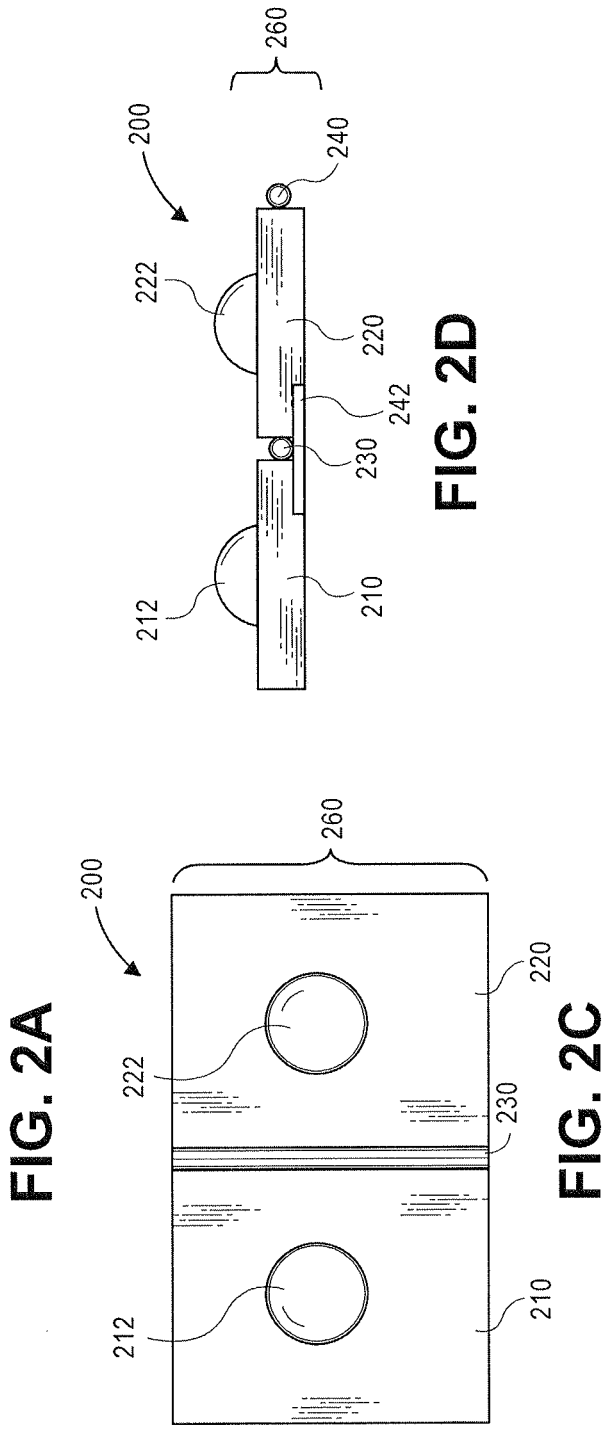

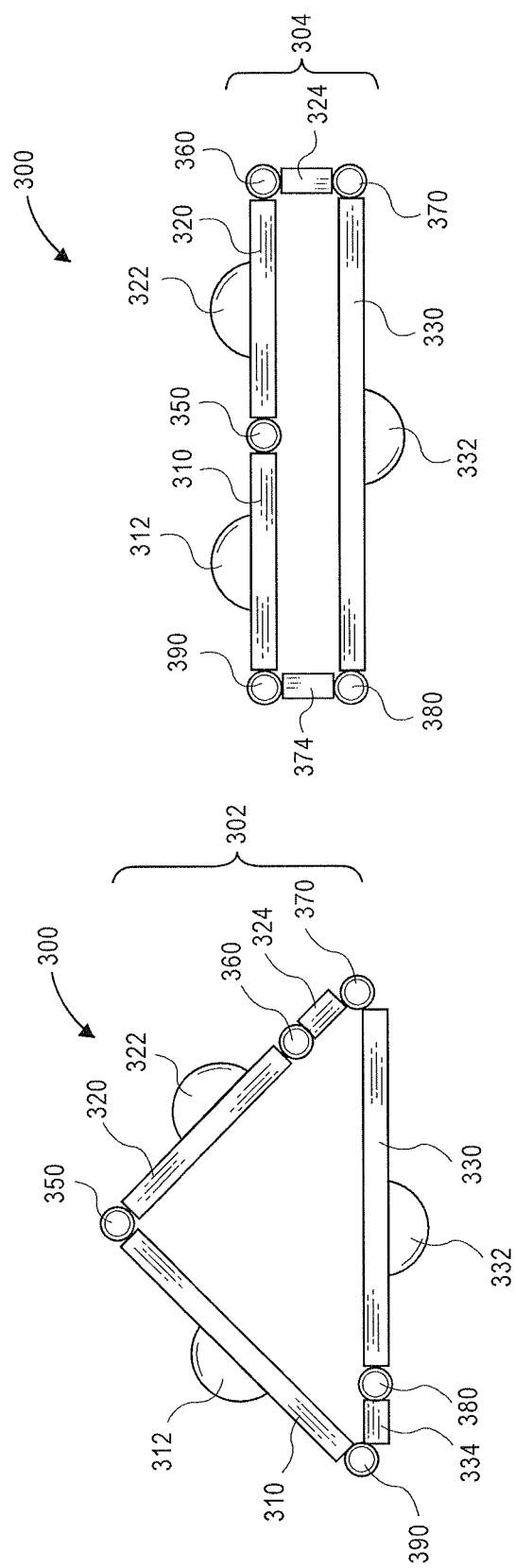

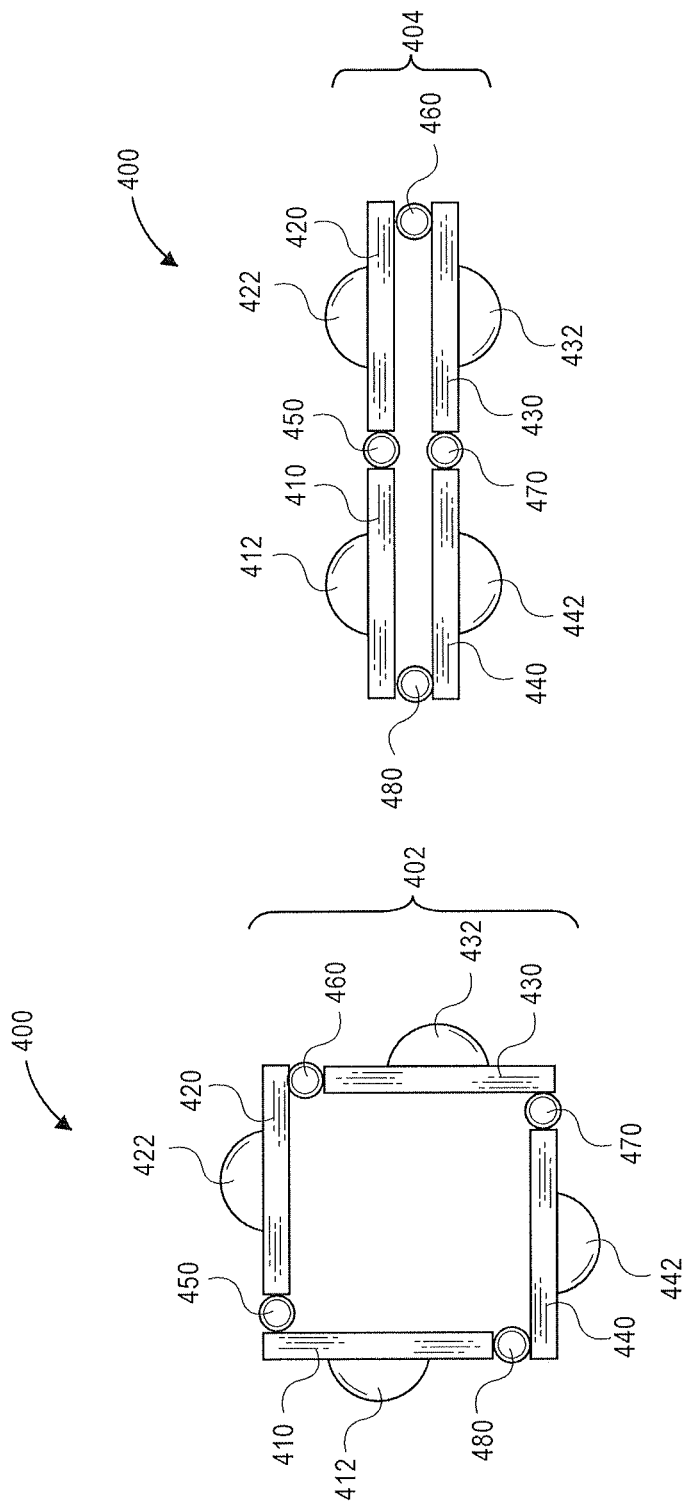

RECONFIGURABLE MULTI-MODE CAMERA

CROSS-REFERENCES TO RELATED APPLICATIONS

NOT APPLICABLE

BACKGROUND

Imaging devices are widely used for different applications. For example, a small form factor camera can be integrated with a portable or mobile device. Such an imaging device is used for day-to-day tasks including capturing still images and videos.

In addition, imaging devices provide a wide range of capabilities. These capabilities include monoscopic and stereoscopic imagery. Generally, a capability of an imaging device depends on its optical sensor(s). For example, to generate a three-hundred sixty degree monoscopic field of view image, an imaging device includes a plurality of optical sensors. These optical sensors are disposed to point in different directions such that at least a three-hundred sixty degree field of view is covered. In another example, to generate a one-hundred eighty degree stereoscopic field of view image, an imaging device also includes a plurality of optical sensors. In this example, the optical sensors are disposed to point in a same direction such that image data of an object is captured along the same direction at different focal depths.

However, no existing imaging device provides a capability of switching between monoscopic and stereoscopic imagery that uses multiple optical sensors. For instance, existing imaging devices do not switch from n a three hundred sixty degree monoscopic field of view to a one-hundred eighty degree stereoscopic field of view, and vice versa.

BRIEF SUMMARY

Generally, an imaging device that is reconfigurable to support different operational states is described. The operational states support monoscopic imagery and stereoscopic imagery. In an example, the imaging device includes multiple platforms. Each platform houses one or more optical sensors. At least the two platforms are arranged in a particular arrangement based on a pivotal connector that connects the two platforms. These platforms are re-arranged in another arrangement based on the pivotal connector. For example, a first arrangement points the optical sensors in different directions to cover different fields of views. This first arrangement supports monoscopic imagery. A second arrangement points the optical sensors in about a same direction to cover substantially a same field of view. This second arrangement supports stereoscopic imagery. The pivotal connector is operated to switch the two platforms between the first arrangement and the second arrangement.

In addition, a computer-implemented method for operating the imaging device is described. The computer-implemented method includes selecting an operational sate of the imaging device. The operational state can correspond to either the monoscopic imagery or the stereoscopic imagery and is selected based on the arrangement of the platforms. Image data captured by each of the optical sensors are used to generate a monoscopic image or a stereoscopic image depending on the operational state.

In an example, a reconfigurable imaging apparatus includes a first platform, a first optical sensor disposed on the first platform, a second platform, a second optical sensor disposed on the second platform, and a pivotal connector connected with the first platform and connected with the second platform. The pivotal connector is configured to pivot the first platform and the second platform between a first arrangement and a second arrangement. The first arrangement corresponds to a monoscopic state of the imaging apparatus and points the first optical sensor and the second optical sensor in substantially different directions. The second arrangement corresponds to a stereoscopic state of the imaging apparatus and points the first optical sensor and the second optical sensor in substantially a same direction.

In an example, a computer-implemented method is includes accessing, by a computer, first image data captured by a first optical sensor of a reconfigurable imaging device. The first optical sensor is disposed on a first platform of the reconfigurable imaging device. The computer-implemented method also includes accessing, by the computer, second image data captured by a second optical sensor of the reconfigurable imaging device. The second optical sensor is disposed on a second platform of the reconfigurable imaging device. The computer-implemented method also includes selecting, by the computer, an operational state of the reconfigurable imaging device from a monoscopic state and a stereoscopic state. The operational state is selected based on operational data indicative of an arrangement of the first platform and the second platform. The arrangement is formed based on a pivotal connector that is connected with the first platform and the second platform and that is configured to pivot the first platform and the second platform. The computer-implemented method also includes generating, by the computer, a monoscopic image or a stereoscopic image from the first image data and the second image data based on the operational state.

In an example, an imaging system includes a first platform, a first optical sensor disposed on the first platform, a second platform, a second optical sensor disposed on the second platform, and a pivotal connector connected with the first platform and the second platform. The pivotal connector is configured to pivot the first platform and the second platform. An arrangement of the first platform and the second platform is formed based on a pivoting by the pivotal connector of the first platform and the second platform. The imaging system also includes a processor and a memory storing computer-readable instructions that, upon execution by the processor, cause the imaging system to select an operational state of the imaging system based on the arrangement of the first platform and the second platform, and generate an image from first image data and second image data based on the operational state. The first image data is captured by the first optical sensor. The second image data is captured by the second optical sensor.

A further understanding of the nature and the advantages of the embodiments disclosed and suggested herein may be realized by reference to the remaining portions of the specification and the attached drawings.

BRIEF DESCRIPTION OF THE DRAWINGS

FIGS. 2A, 2B, 2C, and 2D illustrate different views of a reconfigurable imaging device according to an embodiment of the present disclosure.

FIGS. 3A and 3B illustrate another example of a reconfigurable imaging device according to an embodiment of the present disclosure.

FIGS. 4A and 4B illustrate another example of a reconfigurable imaging device according to an embodiment of the present disclosure.

DETAILED DESCRIPTION

Figure 1A:
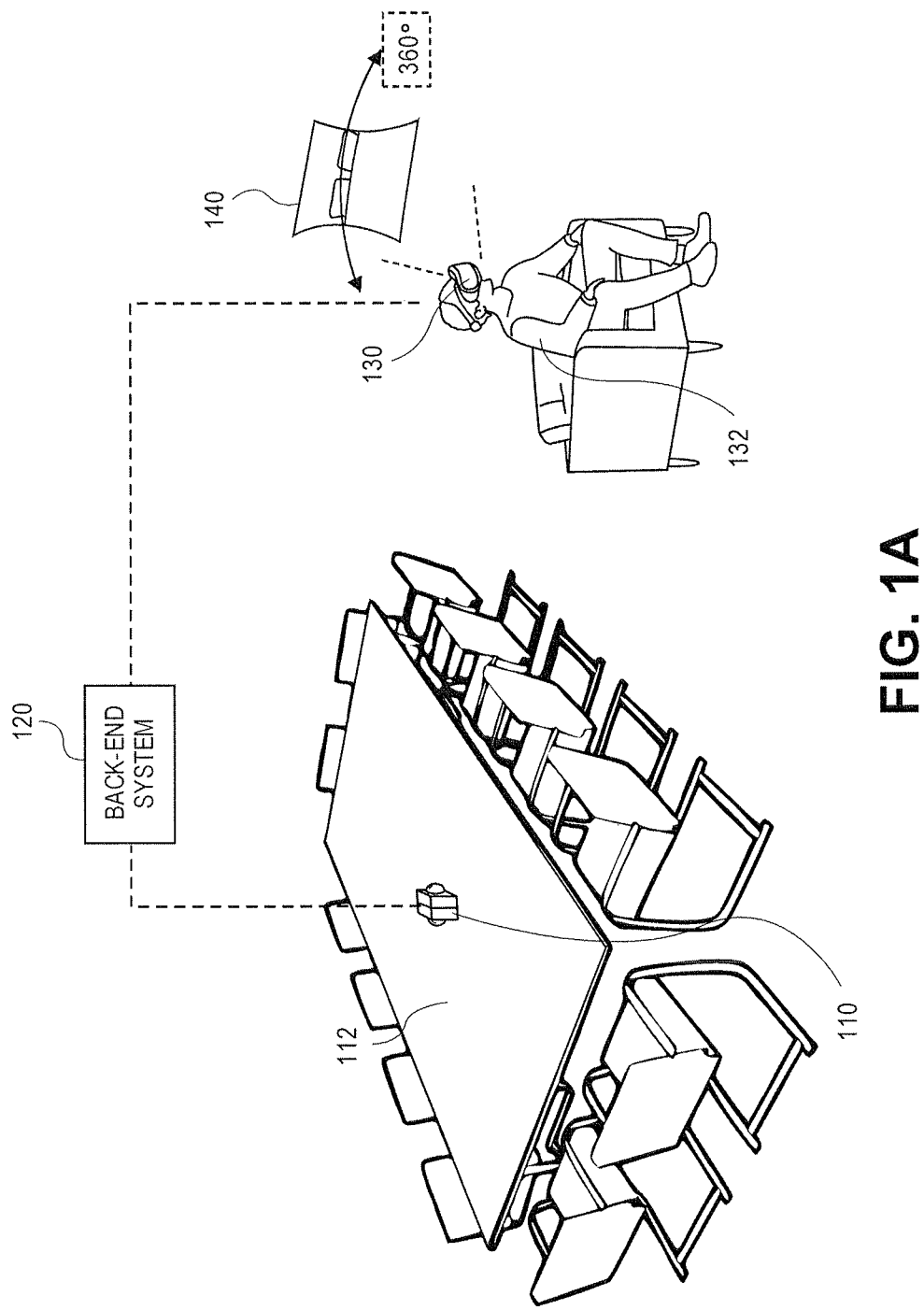
FIGS. 1A and 1B illustrate an example environment for operating an imaging device according to an embodiment of the present disclosure.

The present disclosure is directed to, among other things, a reconfigurable imaging device. The reconfigurable imaging device supports switching between different operational capabilities, such as between monoscopic imagery and stereoscopic imagery. In an example, the reconfigurable imaging device includes multiple platforms and one or more pivotal connectors. Each platform includes, houses, attaches, or holds one or more components of a camera. For instance, an optical sensor is disposed on a platform. A pivotal connector connects at least two of the platforms and is configured to pivot the two platforms according to different pivot angles. Each pivot angle corresponds to an arrangement of the platforms.

In one arrangement supported by the pivotal connector, an optical sensor of one platform and an optical sensor of another platform point in different directions, thereby capturing image data at different, individual field of views. The image data from both optical sensors can be stitched together to generate an image having a field of view greater than either individual field of views. Depending on the number of platforms, the number of optical sensors, and/or the individual field of views, at least a three-hundred degree field of view monoscopic image is generated from the captured image data. Accordingly, this arrangement corresponds to a monoscopic state of the reconfigurable imaging device.

In another arrangement supported by the pivotal connector, the two optical sensors of the two platforms point in a same direction, thereby capturing image data at different depths within substantially a same field of view. The captured image data can be arranged to generate a stereoscopic image. Accordingly, this arrangement corresponds to a stereoscopic state of the reconfigurable imaging device.

To illustrate, consider an example of a reconfigurable imaging device that includes a pivotal connector that connects two platforms. In this example, the pivotal connector includes a hinge. A wide angle optical sensor (e.g., one having about a two hundred-degree field of view) is disposed on each platform and is pointed outwardly from a surface of the platform. In a first arrangement, the hinge arranges the two platforms in two parallel planes. The optical sensors are pointed in opposite field of views such that at least a three-hundred degree field of view is simultaneously covered by the optical sensors. In the two hundred-degree illustration, about a four-hundred degree field of view is covered and includes a forty degree overlap. The image data captured by both optical sensors is stitched to generate at least a three-hundred degree field of view monoscopic image. In a second arrangement, the hinge arranges the two platforms in substantially a same plane. The optical sensors are pointed in substantially the same field of view. Because of the distance between the centers of the two optical sensors, image data is captured at different depths. This image data is arranged to generate at least a one-hundred degree field of view stereoscopic image.

The above examples are provided for illustrative purposes. These and other arrangements and elements of a reconfigurable imaging device are further described herein next. In the interest of clarity of explanation, example platforms and pivotal connectors are described. As described, a platform includes a housing that houses, attaches, and/or holds electrical, electronic, and mechanical components of a reconfigurable imaging device. The housing can be made of different materials such as plastic, metal, and/or other materials. However, embodiments of the reconfigurable imaging device can include other types of platform, such as a case, a container, a frame, a closed enclosure, and/or an open enclosure. An example pivotal connector includes a hinge. However, embodiments of the reconfigurable imaging device can include other types of pivotal connector, such as a number of pivots, a flexible membrane, and/or other connectors for connecting at least two platforms and supporting relative movement of the connected platforms.

Figure 1B:
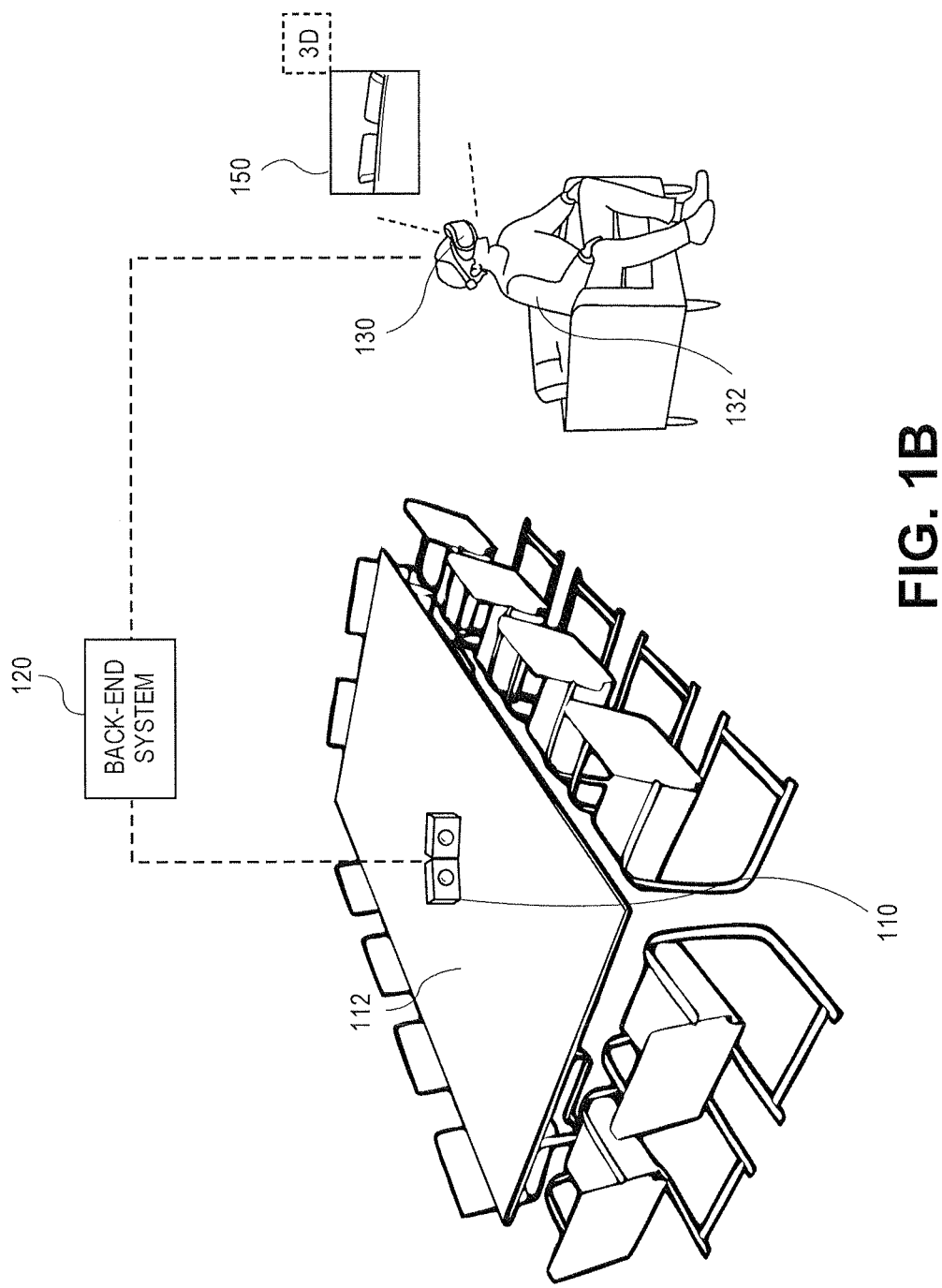

FIGS. 1A and 1B illustrate an example environment for operating an imaging device 110. The imaging device 110 is reconfigurable to support different operational states. An operational sate represents a state of operation, such as a mode under which the imaging device 110 is operated. FIG. A illustrates an example of using the imaging device 110 in a monoscopic state. In comparison, FIG. 1B illustrates an example of using the imaging device 110 in a stereoscopic state. The imaging device 110 represents a standalone camera, a camera interfacing with or integrated within an imaging system, or other types of imaging devices capable of capturing image data and/or generating images. Image data represents data usable by a processor, such as a signal processor or a computer, to generate images. Images represent still images or a video.

Generally, a monoscopic state refers to the capability of the imaging device 110 to capture image data or images in a monoscopic field of view. A single camera, or optical sensor, is used to capture an image in an individual field of view. Images captured by multiple cameras, or optical sensors, are stitched together to create a monoscopic field of view that is greater than any of the individual field of views. For example, whereas an individual field of view is about one-hundred twenty degrees, the monoscocpic field of view can cover a greater range, such as between one-hundred sixty degrees and four-hundred degrees. In an illustrative example of the monoscopic state, the imaging device 110 captures a three-hundred degree still image or video.

Generally, a stereoscopic state refers to the capability of the imaging device 110 to capture image data or images in a stereoscopic field of view. In an example, two cameras, or two optical sensors, separated by a certain distance are used to capture image data in a same field of view (e.g., the stereoscopic field of view) to give the perception of depth. Each of the cameras, or optical sensors, is mapped to a human eye. The distance between the cameras, or optical sensors, corresponds to an interpupillary distance (IPD) between the human eyes. An image is generated separately from the image data of each camera or optical sensor, resulting in a left eye image and right eye image. The pair of left and right images are arranged side-by-side to create an illusion of depth to the human eyes. This pair represents a three dimensional (3D) image. The 3D image maps each of the images to each of the eyes. In an illustrative example of the stereoscopic state, the imaging device 110 captures a 3D still image or video.

FIG. A illustrates operating the imaging device 110 in the monoscopic state within an environment 112, such as a conference room environment. Other environments are also possible. The imaging device 110 interfaces with a back-end system 120 over, for example, a data network. A virtual reality (VR) headset 130 also interfaces with the back-end system 120 over the same or a different data network to access and display images of the environment 112. Other end user devices, such as a desktop, a portable device, or a mobile device can also interface with the back-end system 120. The data network represents a set of network devices that facilitate a data exchange and can include a public network, such as the Internet, and/or a private network, such as an intranet.

The back-end system 120 represents a computing system, such as a server or a cloud-based service, that provides image-based operations. Some of the operations are available to end users. For example, the back-end system 120 allows multiple users to access and receive images based on a pull or push mechanism. Hence, a user 132 operating the VR headset 130 can view stored or live images of the environment 112. The back-end system 120 can allow a multi-user access and can augment the images. For instance, multiple users operating VR headsets can have simultaneous virtual access to environment 112 to conduct a virtual conference among themselves.

Other operations of the back-end system 120 are available to the imaging device 110. In one example, the imaging device 110 locally processes captured image data to generate and send images to the back-end system 120. In turn, the back-end system stores and manages user access to these images. In another example, the image generation is distributed between the imaging device 110 and the back-end system 120. For instance, the imaging device 110 transmits the image data to the back-end system 120. In turn, the back-end system generates and stores the images. In yet another example, the back-end system controls some of the capabilities of the imaging device 110. For example, based on a set of rules (e.g., calendar-based rules) or based on an interface with an administrator console, the back-end system 120 turns on and off the imaging device 110, instructs the imaging device 110 to enter in a standby state, and/or controls the selection of the operational state of the imaging device. In particular, the back-end system 120 can instruct the imaging device 110 to enter the monoscopic state or the stereoscopic state. Accordingly, internal components of the imaging device 110, such as electrical, electronic, and mechanical component, changes the arrangements of the imaging device's 110 housings hosting the cameras or optical sensors. A proper arrangement can be set based on a hinge connecting the housings as further described in the next figures.

Hence, and as illustrated in FIG. 1A, the imaging device 110 provides monoscopic imagery to the user 132. The user views, for instance, three-hundred sixty degree images 140 of the environment 112 via the VR headset 130.

FIG. 1B illustrates operating the imaging device 110 in the stereoscopic state within the environment 112. The switch from the monoscopic state to the stereoscopic state, and vice versa, can occur in different ways depending on the reconfigurable capability of the imaging device 110. In an example, the reconfigurable capability is limited to a mechanical reconfiguration. In this example, a user such as an administrator of the conference room mechanically repositions the cameras, or the optical sensors, by moving the housings around the hinge of the imaging device 110. In another example, the reconfigurable capability also include remotely controllable electromechanical components. The controls can be effected through the back-end system 120. Hence, the administrator through an administrator console and/or the user 132 through the VR headset 130 remotely controls the switching to the stereoscopic state.

In the stereoscopic state, the imaging device 110 captures 3D image data. The imaging device 110 and/or the back-end system 120 generates and/or stores 3D images from the 3D image data. The user 132 views the 3D images 150 via the VR headset 130.

Although FIGS. 1A and 1B illustrate a back-end system, such a system need not be used. Instead, an end user device, such as the VR headset 130, can have access to image data and/or images directly from the imaging device 110 and without the back-end system 120. In an example, the device access occurs over a data network. In another example, the device access is facilitated via a transfer of storage media. For instance, the captured image data and/or images are stored on a storage medium, such as on a memory card. The image data and/or images are transferred to the end user device by removing the storage medium from the imaging device 110 and inserting the storage medium 110 in the end user device. In either examples, if only image data is provided, the end user device process the image data to create the images.

FIGS. 2A, 2B, 2C, and 2D illustrate different views of a reconfigurable imaging device 200 that supports multiple operational states, such as the imaging device 110 of FIG. 1. In an example, the imaging device 200 includes a housing 210 and a housing 220 and a hinge 230. The hinge 230 is connected with the housing 210 and 220. As described herein above, housings and hinges are examples of platforms and pivotal connectors, respectively. Other platform types and/or pivotal connector types are also possible. The imaging device 200 also includes an optical sensor 212 and an optical sensor 222. The housing 210 houses the optical sensor 212 and includes an aperture such that the optical sensor 212 is exposed to light of an environment external to the housing 210 through the aperture. Likewise, the housing 220 houses the optical sensor 222. The imaging device 200 supports a monoscopic state and a stereoscopic state based on respective arrangements of the optical sensors 212 and 222.

FIGS. 2A and 2B illustrate a side view and a top view, respectively of a first arrangement 250 of the imaging device 200. The arrangement 250 supports the monoscopic state. In particular, each of the optical sensors 212 and 222 has a wide field of view, such as about a two-hundred degree field of view. The arrangement 250 points the optical sensors in substantially opposite directions. As illustrated in FIG. 2A, the optical sensor 212 covers a field of view that extends outwardly to the left of the imaging device 200, whereas the optical sensor 222 covers a field of view that extends outwardly to the right of the imaging device 200. Thus, the collective field of view of both optical sensors 212 and 222 covers the entire three-hundred sixty degree surrounding of the imaging device 200 with about a forty degrees of overlap for a total of about a four-hundred degree field of view. Image data captured by the optical sensors 212 and 222 can be stitched together to generate at least a three-hundred sixty degree monoscopic field of view image, such as a three-hundred sixty degree image of the imaging device's 200 surrounding.

FIG. 2B illustrates that, in an example, the imaging device 200 also includes a fixed connector 240. The fixed connector 240 is connected with the housings 210 and 220 and holds or maintains the housings 210 and 220 in position to support the arrangement 250. Depending on the material, the dimension, and/or the configurations of each of the housings 210 and 220, different types of fixed connectors are usable. For example, the fixed connector 240 includes any of a pin lock, a bracket, a magnet, and/or a hook and loop fastener.

FIGS. 2C and 2D illustrate a side view and a top view, respectively of a second arrangement 260 of the imaging device 200. The arrangement 260 supports the stereoscopic state. In particular, the arrangement 260 points the optical sensors in substantially the same direction. Thus, the optical sensors 212 and 222 cover substantially the same field of view, with a certain offset. The offset corresponds to the distance between the centers of the optical sensors 212 and 222. This distance can be set as a function of (e.g., to fall within the range of) the human IPD. The captured image data can be packaged to generate a 3D image (e.g., two offset images per 3D image, one for the left eye and one for the right eye). The 3D image covers at least a hundred and eighty degree field of view.

FIG. 2D illustrates that, in an example, the imaging device 200 also includes a fixed connector 242. The fixed connector 242 is connected with the housings 210 and 220 and holds or maintains the housings 210 and 220 in position to support the arrangement 260. Depending on the material, the dimension, and/or the configurations of each of the housings 210 and 220, different types of fixed connectors are usable. For example, the fixed connector 242 includes any of a pin, a bracket, a magnet, and/or a rod.

Although the fixed connector 240 and the fixed connector 242 are illustrated as separate components of the imaging device 200, such connectors 240 and 242 need not be separate. Instead, the connectors 240 and 242 can be integrated with each other or other components, or need not even be used. For instance, other mechanisms are possible to hold the housings 210 and 220 according to the arrangement 250 and the arrangement 260. For instance, the fixed connector 240 and/or the fixed connector 242 can be integrated with the hinge 230. In another illustration, the hinge 230 holds the housings 210 and 220 in position based on a mechanical force (e.g., a frictional force along the center axis of the hinge 230) or an electromechanical component (e.g., the hinge 230 is a remotely controllable electrical hinge).

In addition, the housings 210 and 220 can house, attach, or hold additional components of the imaging device 200. In an example, the imaging device 200 is a standalone camera. In this example, the housings 210 and 220 include other camera-related hardware, software, and middleware component. In another example, the imaging device 200 interfaces to an imaging system. In this example, some of the camera-related components is distributed between the imaging device 200 and the imaging system. For instance, the imaging device 200 outputs image data to the imaging system. In turn, the imaging system generates images from the image data.

FIGS. 3A and 3B illustrate another example of an imaging device 300 that is reconfigurable to support multiple operational states. Generally, a reconfigurable imaging device can include two or more cameras or optical sensors. The example imaging device 300 includes three optical sensors 312, 322, and 332. In a first arrangement 302, the imaging device 300 supports a monoscopic state. In a second arrangement 304, supports a stereoscopic state, a two dimensional (2D) state, and a monoscopic state. The 2D state represents a capability of the imaging device 300 to capture 2D images at a predefined field of view.

FIG. 3A illustrates a top view of the first arrangements 302 that supports the monoscopic state. As illustrated, the imaging device 300 includes a housing 310 that houses the optical sensor 312, a housing 320 that houses the optical sensor 322, and a housing 330 that houses the optical sensor 332. In addition, the imaging device 300 includes a number of extensions such as an extension 324 and an extension 334. The extensions can be made of the same or a different material as any of the housings 310, 320, and 330. Generally, the extensions facilitate the switching of the imaging device 300 between the first arrangement 302 and the second arrangement 304. The imaging device 300 also includes a number of hinges that connect the housings 310, 320, and 330 and the extensions 322 and 334. For example, a hinge 350 connects the housing 310 and the housing 320. A hinge 360 connects the housing 320 and the extension 324. A hinge 370 connects the extension 324 and the housing 330. A hinge 380 connects the housing 330 and the extension 334. And a hinge 390 connects the extension 334 and the housing 310. In this example, the series of housings, extensions, and hinges forms a closed loop. However, an open loop can be nonetheless used. For instance, the hinge 390 need not be used.

The arrangement 302 points the optical sensors 312, 322, and 332 in different directions to collectively cover a field of view that is greater than any of individual field of views. For example, the arrangement 302 represents a triangular shape. Each of the edges includes one of the housing and, optionally, one of the extensions. Each of the optical sensors 312, 322, and 332 has a wide individual field of view. For example, each individual field of view is at least one-hundred eighty degrees. Thus, the collective field of view (e.g., the field of view of the monoscopic state) is at least three-hundred sixty degrees with about one-hundred and eighty degrees of overlap.

FIG. 3B illustrates a top view of the arrangement 304 that supports the stereoscopic state, the 2D state, and the monoscopic state. In particular, the housings 310, 320, and 330 and the extensions 324 and 334 are re-arranged from the triangular shape to a rectangular shape based on the hinges 350, 360, 370, 380, and 390. The arrangement 304 points the optical sensors 312 and 322 in substantially the same direction to cover substantially the same field of view. Accordingly, image data captured by the optical sensors 312 and 322 is used to generate 3D images (e.g., supports the stereoscopic state) in the arrangement 304. In comparison, the optical sensor 332 is pointed in a different (e.g., opposing direction). Image data captured by the optical sensor 332 is used to generate 2D images (e.g., supports the 2D state). The combination of the optical sensor 312 and the optical sensor 332 supports the monoscopic state because these sensors are pointed in different directions and collectively cover at least a three-hundred sixty degree field of view. Similarly, the combination of optical sensor 322 and the optical sensor 332 also supports the monoscopic state.

FIGS. 4A and 4B illustrate another example of an imaging device 400 that is reconfigurable to support multiple operational states. In this example, the imaging device 400 includes four optical sensors 412, 422, 432, and 444. In a first arrangement 402, the imaging device 400 supports a monoscopic state. In a second arrangement 404, supports a stereoscopic state, a monoscopic state, and a monoscopic-stereoscopic hybrid state. The monoscopic-stereoscopic hybrid state represents a capability of the imaging device 400 to capture 3D images (e.g., stereoscopic images) in a monoscopic field of view (e.g., a three-hundred sixty degree field of view).

FIG. 4A illustrates a top view of the first arrangements 402 that supports the monoscopic state. As illustrated, the imaging device 400 includes a housing 410 that houses the optical sensor 412, a housing 420 that houses the optical sensor 422, a housing 430 that houses the optical sensor 432, and a housing 440 that houses the optical sensor 442. The imaging device 400 also includes a number of hinges that connect the housings 410, 420, and 430, and 440. For example, a hinge 450 connects the housing 410 and the housing 420. A hinge 460 connects the housing 420 and the housing 430. A hinge 470 connects the housing 430 and the housing 440. And a hinge 480 connects the housing 440 and the housing 410. In this example, the series of housings and hinges forms a closed loop. However, an open loop can be nonetheless used. For instance, the hinge 480 need not be used.

The arrangement 402 points the optical sensors 412, 422, a 432, and 442 in different directions to collectively cover a field of view that is greater than any of individual field of views. For example, the arrangement 404 represents a rectangular or square shape. Each of the edges includes one of the housing. Each of the optical sensors 412, 422, a 432, and 442 has a wide individual field of view. For example, each individual field of view is at least one-hundred eighty degrees. Thus, the collective field of view (e.g., the field of view of the monoscopic state) is at least three-hundred sixty degrees with about three-hundred sixty degrees of overlap.

FIG. 4B illustrates a top view of the arrangement 404 that supports the stereoscopic state, the monoscopic state, and the monoscopic-stereoscopic hybrid state. In particular, the housings 410, 420, and 430, and 440 are re-arranged from the rectangular or square shape to a rectangular shape based on the hinges 450, 460, 470, and 480. The arrangement 404 points the optical sensors 412 and 422 in substantially the same direction to cover substantially the same field of view. Accordingly, image data captured by the optical sensors 412 and 422 is used to generate 3D images (e.g., supports the stereoscopic state) in the arrangement 404. Similarly, the arrangement 404 points the optical sensors 432 and 442 in substantially the same direction to cover substantially the same field of view. This field of view is in an opposite direction of the field of view of the optical sensors 412 and 422. Image data captured by the optical sensors 432 and 432 is also used to generate 3D images (e.g., supports the stereoscopic state) in the arrangement 404. The combination of the two optical fields (e.g., the one covered by the optical sensors 412 and 422 in one direction and the other one covered by the optical sensors 432 and 442 in the other direction), support the monoscopic-stereoscopic hybrid state. In particular, the 3D images can be stitched together in this operational state to form together 3D images of at least a three-hundred degree field of view. On the other hand, the combination of either the optical sensor 412 and the optical sensor 432 or 442 supports the monoscopic state because these sensors are pointed in different directions and collectively cover at least a three-hundred sixty degree field of view. Similarly, the combination of optical sensor 422 and either the optical sensor 432 or 442 also supports the monoscopic state.

Figure 5:
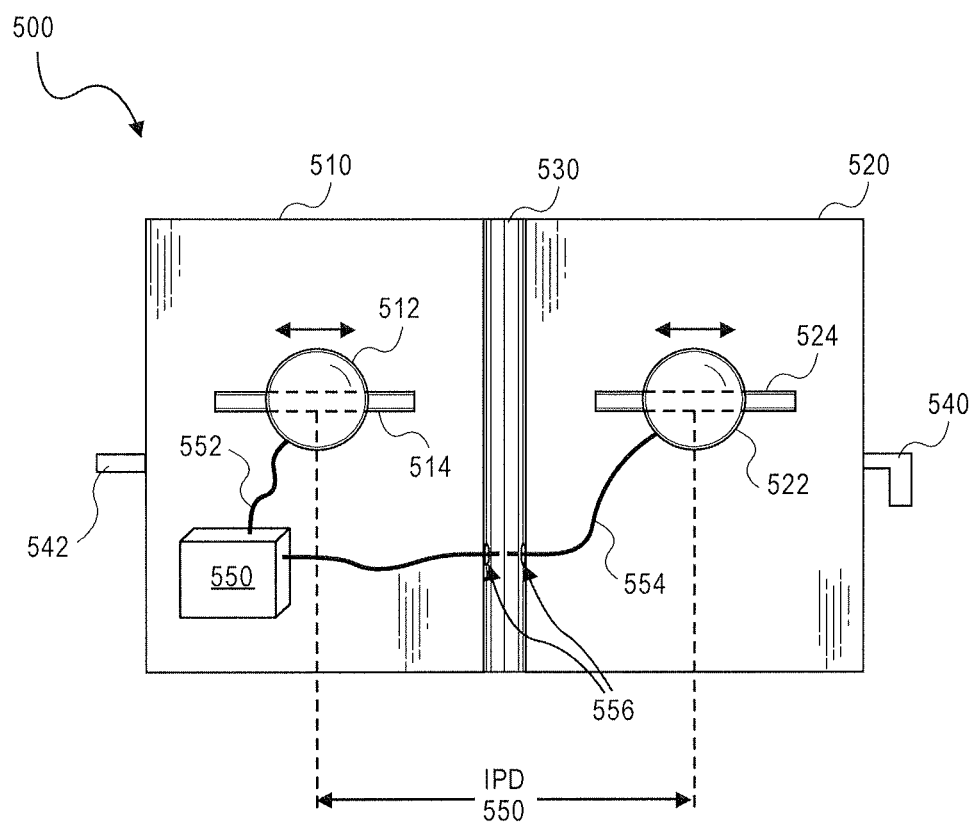
FIG. 5 illustrates an example of additional components of an imaging device according to an embodiment of the present disclosure.

FIG. 5 illustrates an example of additional components of an imaging device 500. Depending on the number of housing and the number of optical sensors, the imaging device 500 is reconfigurable to support different operational states. Generally, the larger the number of housing and/or optical sensors, the larger the number of supported operational states is.

As illustrated in the side view of FIG. 5, the imaging device 500 includes a housing 510 and a housing 520 that are connected with a hinge 530. The housing 510 houses an optical sensor 512. Likewise, the housing 520 houses an optical sensor 524.

The hinge 530 facilitates re-arrangements of the housings 510 and 520. For example, the hinge 530 enables the housings 510 and 520 to be pivoted at different pivot angles relative to each other. The illustrated side view shows a pivot angle of about one-hundred eighty degree. At this pivot angle, the housing arrangement points the optical sensors 512 and 522 in substantially the same direction to support at least a stereoscopic state. In another example, the pivot angle is about zero degree. In this example, the optical sensors 512 and 522 are pointed in substantially opposite directions to support at least a monoscopic state. Other pivot angles are also possible based on the hinge 530 and fall within the range of zero to one-hundred eighty degrees or, even, to three-hundred sixty degrees.

In an example, the hinge 530 is mechanically operated. In this example, a user of the imaging device 500 moves the housings 510 and 520 relative to each other to achieve a pivot angle corresponding to a desired operational state. In addition, the hinge 530 can include visual markings to indicate the pivot angle and/or the corresponding operational state.

In another example, the hinge 530 is electromechanically controlled. A control button initiates the relative movement of housings 510 and 520 to achieve a desired pivot angle. The control button can be local to the imaging device 500 or remote therefrom (e.g., a soft control button on a graphical user interface hosted on a back-end system or on an end user device). A control unit, such as an actuator, integrated or interfacing with the hinge 530 drives the movement via the hinge 530 in response to the activation of the control button. In addition, the hinge 530 can integrate a potentiometer. The potentiometer maps a pivot angle to a certain voltage, resulting in a signal indicating the pivot angle and/or the operational state. The signal is usable to present (e.g., display or provide an audible message) the pivot angle and/or the operational state at a remote device (e.g., the back-end system or the end user device).

The housings need not house the respective optical sensors at fixed locations. Instead, the optical sensors can be moved along one or more directions to, for example, adjust the relative distances between the centers of the optical sensors. Adjusting a distance enables setting the distance to fall within an IPD range of human eyes (e.g., between fifty-two and seventy-eight millimeters or two to three inches).

In an example, the optical sensor 512 is mounted on or attached to a sliding connector 514 of the housing 510. The sliding connector 514 facilitates the movement of the optical sensor 512 in a direction (e.g., horizontally). For instance, the sliding connector 514 includes any of a rail or a groove. Accordingly, the optical sensor 512 can be moved closer to or away from the optical sensor 522 of the other housing 520 in an arrangement that supports the stereoscopic state. Additionally or alternatively, the optical sensor 512 is mounted on or attached to a sliding connector 524 of the housing 520. This sliding connector 524 facilitates the movement of the optical sensor 522 in the same direction (e.g., horizontally) or a different direction (e.g., vertically). If the same direction is used, the optical sensor 522 can be moved closer to or away from the optical sensor 512 in an arrangement that supports the stereoscopic state. If another direction is used, the optical sensor 522 can moved closer to or away from another optical sensor of yet another housing. Regardless of the number and directions of sliding connectors, the centers of the optical sensors 512 and 522 can be positioned at an IPD distance 550.

In an example, the sliding connector 514 and, similarly, the sliding connector 524 are mechanically operated. In this example, the user moves the optical sensors 512 and 522 relative to each other to achieve a desired distance. In addition, the sliding connectors 514 and 524 can include visual markings to indicate the distance.

In another example, the sliding connector 514 and, similarly, the sliding connector 524 are electromechanically operated. In this example, a local or remote control button initiates the relative movement. A control unit, such as an actuator, integrated or interfacing with the sliding connectors 514 and 524 drives the movement via the sliding connectors 514 and 524 in response to the activation of the control button. In addition, the sliding connectors 514 and 524 can integrate potentiometer(s). The potentiometer(s) maps the resulting distance to a certain voltage, resulting in a signal indicating the distance. The signal is usable to present (e.g., display or provide an audible message) the distance at a remote device (e.g., the back-end system or an end user device).

The imaging device 500 also includes a fixed connector. The fixed connector maintains or holds the housings 510 and 520 at a particular pivot angle to support a desired arrangement and, equivalently, a desired operational state. As illustrated in FIG. 5, the fixed connector includes a pin 540 and a loop 542. When the housings 510 and 520 are arranged to support the monoscopic state, the pin 540 is inserted in the loop 542 to maintain this arrangement. Other types of a fixed connector are also possible, such as a bracket, a rod, a magnet, and/or a hook and loop fastener. Additionally, the fixed connector is mechanically and/or electromechanically operated.

In addition, the imaging device 500 includes other electrical, electronic, and mechanical components to support the reconfigurable capabilities and the imaging capabilities of the imaging device 500. For instance, the imaging device 500 includes cables, power source(s), signal processor(s), memories, processors, power ports, data ports, user interfaces, and other camera-related components. Some or all of these components can be housed within the housings 510 and/or 520.

In an example, the imaging device 500 includes a processing module 550 in the housing 510. The processing module 550 represents a signal processor, a memory, and/or a processor of the imaging device 500 suitable for processing image data captured by the optical sensors 512 and 514 and, optionally, to effectuate control over any of the connectors, such as the hinge 530, the sliding connectors 514 and 524, and the fixed connector. A signal cable 552 couples the optical sensor 511 and the processing module 550. The signal cable 552 runs through the housing 510. Similarly, a signal cable 554 couples the optical sensor 522 and the processing module 550. The signal cable 554 runs through the housing 520 and the housing 510. In addition, the signal cable runs around or through the hinge 530 based on a set of cable interfaces 556 (e.g., holes, cable ties, etc.).

In an example, the imaging device 500 represents a reconfigurable multi-camera imaging apparatus. Such an apparatus includes a first camera having a first field of view. For instance, the first camera includes the optical sensor 512. The reconfigurable multi-camera imaging apparatus also includes a second camera having a second field of view. For instance, the second camera includes the optical sensor 522. In addition, the reconfigurable multi-camera imaging apparatus includes a hinge pivotally connecting the first camera and the second camera, such as the hinge 530. Further, the reconfigurable multi-camera imaging apparatus includes a locking element, such as the fixed connector formed by the pin 540 and the loop 542. The locking element is configured to hold the first camera and the second camera at one or more fixed pivot angles with respect to one another. Each fixed pivot angle corresponds to an arrangement of the first camera and the second camera. In addition, the reconfigurable multi-camera imaging apparatus includes a signal processor. For instance, the signal processor is part of the processing module 550. The reconfigurable multi-camera imaging apparatus also includes a signal cable from the second camera, such as the signal cable 554. The signal cable traverses the hinge to the signal processor. The signal processor is configured to input signals from the first camera and the second camera. In a first arrangement of the pivot angles, the signal processor is configured to combine a first image from the first camera and a second image from the second camera into a single combined image with a field of view that is greater than either the first field of view and the second field of view. In a second arrangement of the pivot angles, the signal processor is configured to package a first image from the first camera and a second image from the second camera into a stereoscopic image.

Figure 6:
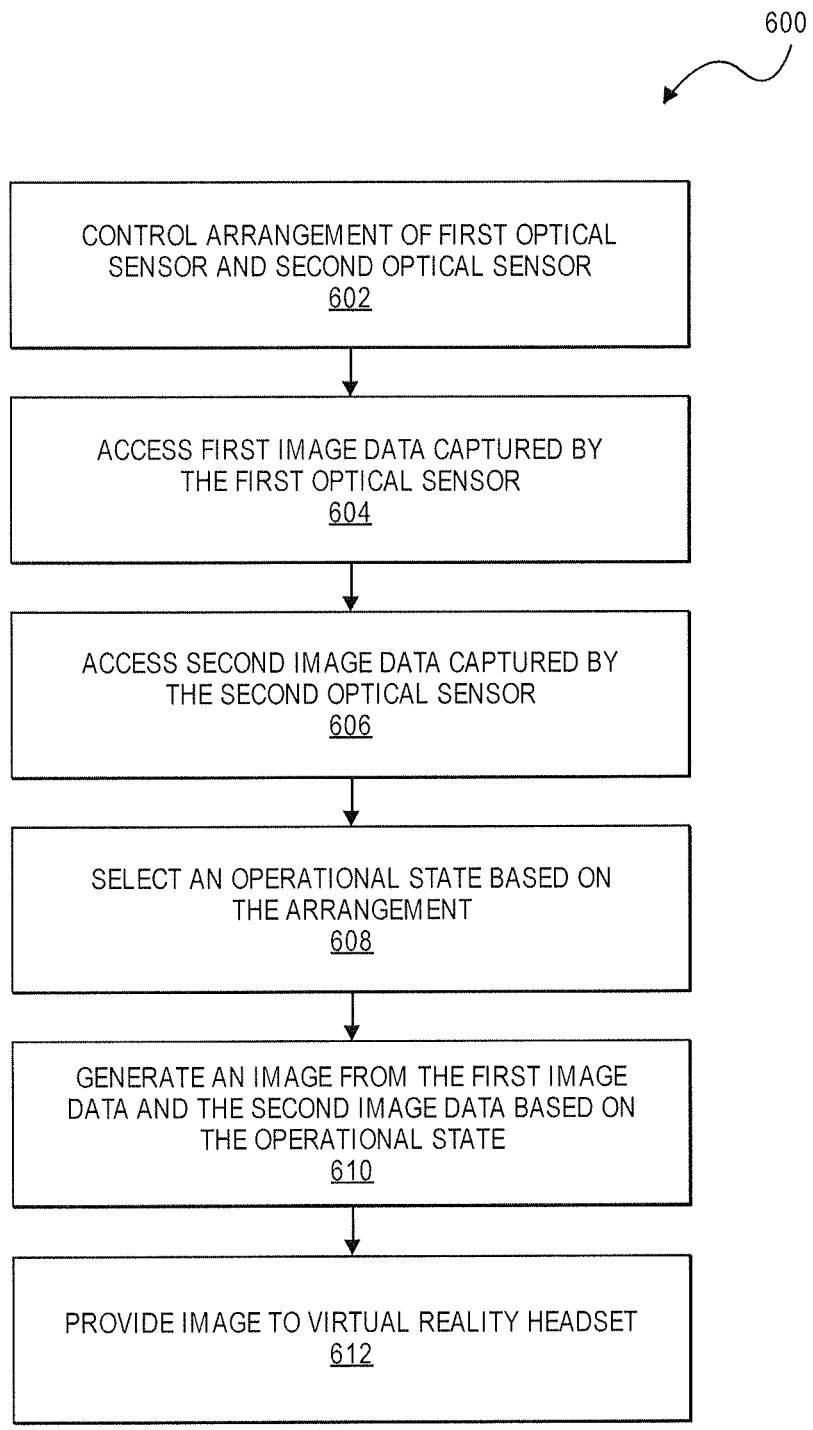
FIG. 6 illustrates an example flow for operating a reconfigurable imaging device according to an embodiment of the present disclosure.

FIG. 6 illustrates an example flow 600 for operating a reconfigurable imaging device in different operational states. A processor is illustrated as performing operations of the flow 600. For example, the processor is coupled to a computer-readable storage medium and executes the computer-readable instructions stored in the computer-readable storage medium. The computer-readable instructions include instructions for performing the operations. Depending on whether the imaging device is a standalone device or is part of a distributed imaging system, the processor and and/or the computer-readable storage medium are part of the imaging device, a back end system, an end user device, or distributed between such components. In addition, although the operations are illustrated in a particular order, some of the operations can be re-ordered or omitted.

In an example, the flow 600 includes an operation 602, where an arrangement of a first optical sensor and a second optical sensor is controlled. For instance, the processor controls the arrangement based on electromechanical components of the imaging device including hinges, fixed connectors, and/or sliding connectors. The control can be initiated based on a set of rules (e.g., calendar-based rules) stored in the computer-readable storage medium or based on an action button local or remote to the imaging device.

Generally, an arrangement corresponds to an operational state. The supported operational states depend on the number of housings and the number and positions of the optical sensors of the imaging device. The operational states include, for instance, a 2D state, a monoscopic state, a stereoscopic state, and a monoscopic-stereoscopic hybrid state. To set up an arrangement for the 2D state, the processor arranges at least one housing having an optical sensor in a particular direction. To set up an arrangement for the monoscopic state, the processor arranges at least two housings in substantially different directions. Each of the housings has at least one optical sensor. As such, the optical sensors have different fields of view. To set up an arrangement for the stereoscopic state, the processor arranges at least two housings in substantially a same direction. Each of the housings has at least one optical sensor. As such, the optical sensors have substantially a same field of view. The distance between the centers of the optical sensors can be adjusted to correspond to a human IPD. To set up an arrangement for the monoscopic-stereoscopic state, the processor arranges at least two optical sensors (on a same housing or different housings) to point in substantially a same first direction and another at least two optical sensors to point in substantially a same second direction. The first direction and the second direction are substantially different.

Although the processor is illustrated as performing the operation 602, this operation can be optional. For instance, the operation 602 is optional when the imaging device does not include the electromechanical components. In such a case, the arrangement is set up mechanically.

In an example, the flow 600 includes an operation 604, where first image data captured by the first optical sensor is accessed. For instance, the processor receives the first image data based on a pull (e.g., video on demand) or push mechanism (e.g., a video broadcast). In this case, a signal processor integrated or interfacing with the first optical sensor processes the sensed raw data to generate the first image data and sends the first image data to the processor.

In an example, the flow 600 includes an operation 606, where second image data captured by the second optical sensor is accessed. This operation can be similar to operation 604. For instance, the processor receives the second image data based on a pull or push mechanism.

Although the first image data and the second image data are described in operations 604 and 606 as being received by the processor based on a pull or push mechanism, other types of access are possible. For instance, the first optical sensor is part of a first camera. The first image data is stored on a first storage medium, such as a first memory card, of the first camera. Likewise, the second optical sensor is part of a same or different camera. The second image data is stored on a same or a different storage medium. The first storage medium (and the second storage medium as applicable) can be removed from the first camera (and the second camera as applicable) and inserted in a data port(s) accessible to the processor. Hence, the processor accesses the first and second image data from the inserted storage medium (or storage media).

In an example, the flow 600 includes an operation 608, where an operational state is selected based on the arrangement. Different selection techniques are possible depending on the reconfiguration capabilities of the imaging device. In one technique, if the processor controls the arrangement as in operation 604, the arrangement is already known to the processor. As such, the processor accesses a table (or some other data structure) that maps arrangements to corresponding operational states and selects the proper operational state given the known arrangement. Such a table is stored in the computer-readable storage medium. In another technique, the arrangement may not be already known to the processor. As such, the processor first determines the arrangement and then selects the operational state from the table.

In an example, the arrangement is determined from a selected button (or key) on the imaging device. For instance, the button identifies the arrangement or the respective operational state to the user. A user selection of the button triggers a respective selection signal to be sent to the processor. In another example, no user selection or button is needed. Instead, the hinge(s), fixed connector(s), and/or sliding connector(s) of the image device include a potentiometer(s). The processor processes a signal(s) generated by a potentiometer(s) to determine the arrangement. In yet another illustration, the processor analyzes the first and second image data to detect objects. If the detection indicates that a number of objects are detected in the first image data but not in the second image data, the processor determines that the optical sensors are pointed in different directions, thereby the arrangement is for a monoscopic state. On the other hand, if the same objects detected in the first image are also detected in the second image, the processor determines that the optical sensors are pointed in substantially the same directions, thereby the arrangement is for a stereoscopic state.

In an example, a combination of the above techniques are performed. The combination enables a determination of the arrangement at a higher level of confidence and/or a generation of error notifications. For instance, if the potentiometer-readings match the image processing determination, the respective arrangement is confirmed. However, if there is a mismatch, an error notification is generated. The error notification can be presented in different ways. For instance, a visual presentation (e.g., an LED light of a particular color or blinking rate) is activated at the imaging device. In another illustration, an error message is displayed at a graphical user interface. Other presentation modalities are also usable, such as an audible alert.

In an example, the flow 600 includes an operation 610, where an image is generated from the first image data and the second image data based on the operational state. For instance, the processor initiates and executes an imaging process to generate the image according to the operational state. The different imaging processes can be defined as part of the computer-readable instructions stored in the computer-readable storage medium. When the monoscopic state is selected as the operational state, the imaging process includes a stitching process and an edge smoothing process applied to the first and second image data. In comparison, when the stereoscopic state is selected as the operational state, the imaging process includes a stereoscopy process applied to the first and second image data. The stereoscopy process includes generating a first image from the first image data and a second image from the second image data, and arranging the first image and the second image side-by-side to create a perception of depth. The side-by-side arrangement of the image pair represents a 3D image.

In an example, the flow 600 includes an operation 612, where the image is provided to a virtual headset (and, similarly, another end user device). If the processor is a component of the virtual headset, providing the image includes displaying the image on a graphical user interface. Otherwise, providing the image includes sending the image to the virtual headset for display thereat.

Figure 7:
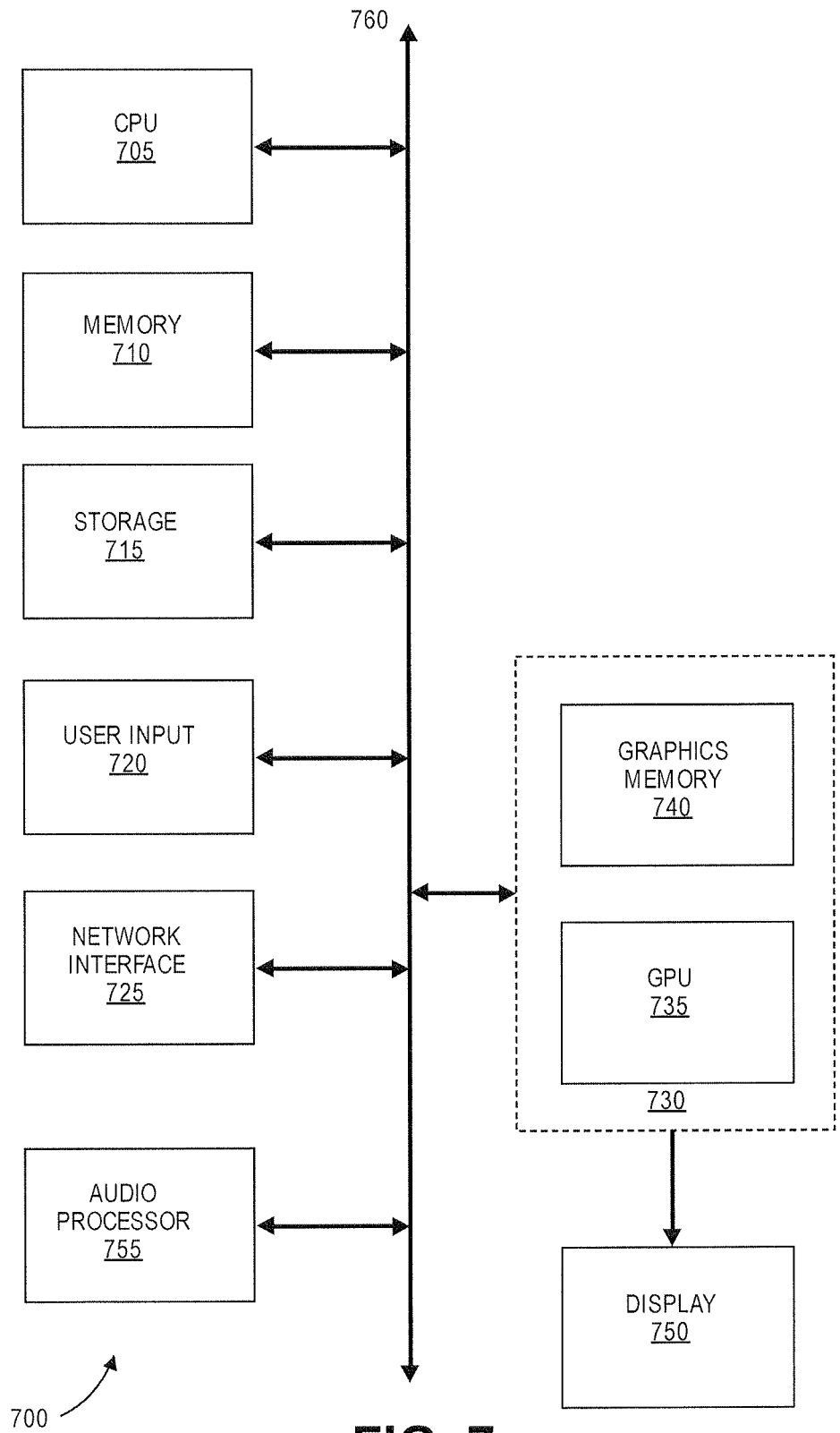
FIG. 7 illustrates a computer system suitable according to an embodiment of the present disclosure.

FIG. 7 illustrates an example of a hardware system suitable for implementing a computer system 700 in accordance with various embodiments. The computer system 700 includes, for example, components of an imaging device, a back end system, a virtual headset, and/or other end user devices. The computer system 700 includes a central processing unit (CPU) 705 for running software applications and optionally an operating system. The CPU 705 may be made up of one or more homogeneous or heterogeneous processing cores. Memory 710 stores applications and data for use by the CPU 705. Storage 715 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 720 communicate user inputs from one or more users to the computer system 700, examples of which may include keyboards, mice, joysticks, touch pads, touch screens, still or video cameras, and/or microphones. Network interface 725 allows the computer system 700 to communicate with other computer systems via an electronic communications network, and may include wired or wireless communication over local area networks and wide area networks such as the Internet. An audio processor 755 is adapted to generate analog or digital audio output from instructions and/or data provided by the CPU 705, memory 710, and/or storage 715. The components of computer system 700, including the CPU 705, memory 710, data storage 715, user input devices 720, network interface 725, and audio processor 755 are connected via one or more data buses 760.

A graphics subsystem 730 is further connected with the data bus 760 and the components of the computer system 700. The graphics subsystem 730 includes a graphics processing unit (GPU) 745 and graphics memory 740. The graphics memory 740 includes a display memory (e.g., a frame buffer) used for storing pixel data for each pixel of an output image. The graphics memory 740 can be integrated in the same device as the GPU 745, connected as a separate device with the GPU 745, and/or implemented within the memory 710. Pixel data can be provided to the graphics memory 740 directly from the CPU 705. Alternatively, the CPU 705 provides the GPU 745 with data and/or instructions defining the desired output images, from which the GPU 745 generates the pixel data of one or more output images. The data and/or instructions defining the desired output images can be stored in the memory 710 and/or graphics memory 740. In an embodiment, the GPU 745 includes 3D rendering capabilities for generating pixel data for output images from instructions and data defining the geometry, lighting, shading, texturing, motion, and/or camera parameters for a scene. The GPU 745 can further include one or more programmable execution units capable of executing shader programs.

The graphics subsystem 730 periodically outputs pixel data for an image from the graphics memory 740 to be displayed on the display device 750. The display device 750 can be any device capable of displaying visual information in response to a signal from the computer system 700, including CRT, LCD, plasma, and OLED displays. The computer system 700 can provide the display device 750 with an analog or digital signal.

In accordance with various embodiments, the CPU 705 is one or more general-purpose microprocessors having one or more processing cores. Further embodiments can be implemented using one or more CPUs 705 with microprocessor architectures specifically adapted for highly parallel and computationally intensive applications, such as media and interactive entertainment applications.

The components of a system may be connected via a network, which may be any combination of the following: the Internet, an IP network, an intranet, a wide-area network ("WAN"), a local-area network ("LAN"), a virtual private network ("VPN"), the Public Switched Telephone Network ("PSTN"), or any other type of network supporting data communication between devices described herein, in different embodiments. A network may include both wired and wireless connections, including optical links. Many other examples are possible and apparent to those skilled in the art in light of this disclosure. In the discussion herein, a network may or may not be noted specifically.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain. "About" includes within a tolerance of ±0.01%, ±0.1%, ±1%, ±2%, ±3%, ±4%, ±5%, ±8%, ±10%, ±15%, ±20%, ±25%, or as otherwise known in the art. "Substantially" refers to more than 66%, 75%, 80%, 90%, 95%, 99%, 99.9% or, depending on the context within which the term substantially appears, value otherwise as known in the art.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A reconfigurable imaging apparatus comprising:
   a first platform;
   a first sliding connector connected with the first platform;
   a first optical sensor disposed on the first sliding connector;
   a second platform;
   a second sliding connector connected with the second platform, the first sliding connector and the second sliding connector being separate and independently operable from each other;
   a second optical sensor disposed on the second sliding connector; and
   a pivotal connector connected with the first platform and connected with the second platform, wherein the pivotal connector is configured to pivot the first platform and the second platform between a first arrangement and a second arrangement, wherein the first arrangement corresponds to a monoscopic state of the imaging apparatus and points the first optical sensor and the second optical sensor in substantially different directions, and wherein the second arrangement corresponds to a stereoscopic state of the imaging apparatus and points the first optical sensor and the second optical sensor in substantially a same direction,
   wherein, in the second arrangement, the first sliding connector is configured to facilitate movement of the first optical sensor between a first point on the first sliding connector and over the first platform and a second point on the first sliding connector and over the first platform in a direction toward the second optical sensor, and wherein the movement of the first optical sensor is parallel to the first platform.

2. The reconfigurable imaging apparatus of claim 1, further comprising:
   a processor; and
   a memory storing computer-readable instructions that, upon execution by the processor, cause the reconfigurable imaging apparatus to:
     select the monoscopic state as an operational state of the reconfigurable imaging apparatus based on the pivotal connector disposing the first optical sensor and the second optical sensor in the first arrangement;
     select the stereoscopic state as the operational state of the reconfigurable imaging apparatus based on the pivotal connector disposing the first optical sensor and the second optical sensor in the second arrangement;
     receive first image data captured by the first optical sensor and second image data captured by the second optical sensor; and
     generate an image from the first image data and the second image data based on the operational state.

3. The reconfigurable imaging apparatus of claim 2, wherein the image comprises at least a three-hundred degree field of view monoscopic image for the monoscopic state, and wherein the image comprises at least a one-hundred degree stereoscopic field of view image for the stereoscopic state.

4. The reconfigurable imaging apparatus of claim 1, wherein the first sliding connector is substantially perpendicular to the pivotal connector and comprises at least one of: a rail or a groove.

5. The reconfigurable imaging apparatus of claim 1, further comprising a fixed connector that is configured to fix the first platform and the second platform in the first arrangement or the second arrangement, wherein the fixed connector comprises at least one of: a pin lock, a bracket, or a magnet.

6. The reconfigurable imaging apparatus of claim 1, wherein, in the second arrangement, the second sliding connector is configured to facilitate movement of the second optical sensor between a first point on the second sliding connector and over the second platform and a second point on the second sliding connector and over the second platform in a direction toward the first optical sensor, and wherein the movement of the second optical sensor is parallel to the second platform.

7. A computer-implemented method comprising:
   accessing, by a computer, first image data captured by a first optical sensor of a reconfigurable imaging device, wherein the first optical sensor is disposed on a first sliding connector of a first platform of the reconfigurable imaging device;
   accessing, by the computer, second image data captured by a second optical sensor of the reconfigurable imaging device, wherein the second optical sensor is disposed on a second sliding connector of a second platform of the reconfigurable imaging device, wherein the first sliding connector and the second sliding connector are separate and independently operable from each other, wherein the first sliding connector is configured to facilitate movement of the first optical sensor between a first point on the first sliding connector and over the first platform and a second point on the first sliding connector and over the first platform in a direction toward the second optical sensor, and wherein the movement of the first optical sensor is parallel to the first platform;
   selecting, by the computer, an operational state of the reconfigurable imaging device from a monoscopic state and a stereoscopic state, wherein the operational state is selected based on operational data indicative of an arrangement of the first platform and the second platform, and wherein the arrangement is formed based on a pivotal connector that is connected with the first platform and the second platform and that is configured to pivot the first platform and the second platform; and
   generating, by the computer, a monoscopic image or a stereoscopic image from the first image data and the second image data based on the operational state.

8. The computer-implemented method of claim 7, wherein the computer is remote from the reconfigurable imaging device, and wherein accessing the first image data comprises receiving the first image data from the reconfigurable imaging device over a data network.

9. The computer-implemented method of claim 7, wherein the operational data indicative of the arrangement of the first platform and the second platform is generated based on an analysis by the computer of the first image data and the second image data.

10. The computer-implemented method of claim 7, wherein the operational data indicative of the arrangement of the first platform and the second platform is received from the reconfigurable imaging device.

11. The computer-implemented method of claim 10, wherein the operational data is generated based on a potentiometer disposed within the pivotal connector of the reconfigurable imaging device.

12. The computer-implemented method of claim 11, wherein the operational data is generated based on a pivot angle, wherein the potentiometer is configured to output the pivot angle.

13. The computer-implemented method of claim 10, further comprising:
generating, by the computer, additional operational data indicative of the arrangement of the first platform and the second platform based on an analysis of the first image data and the second image data; and
generating, by the computer, an error notification based on a discrepancy between the operational data received from the reconfigurable imaging device and the additional operational data generated by the computer.

14. The computer-implemented method of claim 7, wherein the operational data indicative of the arrangement of the first platform and the second platform is received from the reconfigurable imaging device based on a fixed connector that is connected with the first platform and the second platform and that is configured to fix the first platform and the second platform in the arrangement.

15. The computer-implemented method of claim 7, further comprising:
controlling, by the computer, the arrangement by pivoting the first platform and the second platform based on the pivotal connector; and
controlling, by the computer, an interpupillary distance (IPD) between the first optical sensor and the second optical sensor based on the first sliding connector.

16. The computer-implemented method of claim 15, wherein the IPD is determined based on an output of a potentiometer of the first sliding connector.

17. The computer-implemented method of claim 7, further comprising:
upon the monoscopic state being selected as the operational state, invoking, by the computer, an image stitching process to generate the monoscopic image from the first image data and the second image data; and
upon the stereoscopic state being selected as the operational state, invoking, by the computer, a stereoscopy process to generate the stereoscopic image from the first image data and the second image data.

18. An imaging system comprising:
a first platform;
a first optical sensor disposed on a first sliding connector of the first platform;
a second platform;
a second optical sensor disposed on a second sliding connector of the second platform, the first sliding connector and the second sliding connector being separate and independently operable from each other;
a pivotal connector connected with the first platform and the second platform, wherein the pivotal connector is configured to pivot the first platform and the second platform, wherein an arrangement of the first platform and the second platform is formed based on a pivoting by the pivotal connector of the first platform and the second platform, wherein the first sliding connector is configured to facilitate movement of the first optical sensor between a first point on the first sliding connector and over the first platform and a second point on the first sliding connector and over the first platform in a direction toward the second optical sensor, and wherein the movement of the first optical sensor is parallel to the first platform;
a processor; and
a memory storing computer-readable instructions that, upon execution by the processor, cause the imaging system to:
select an operational state of the imaging system based on the arrangement of the first platform and the second platform, and
generate an image from first image data and second image data based on the operational state, wherein the first image data is captured by the first optical sensor, and wherein the second image data is captured by the second optical sensor.

19. The imaging system of claim 18, wherein the operational state is selected from a monoscopic state and a stereoscopic state of the imaging system, wherein the image comprises a monoscopic image for the monoscopic state, wherein the image comprises a stereoscopic image for the stereoscopic state, and wherein the computer-readable instructions, upon execution by the processor, further cause the imaging system to provide the monoscopic image or the stereoscopic image to a virtual reality headset based on the operational state.

20. The imaging system of claim 18, further comprising a third platform and a third optical sensor disposed on a third platform, and wherein the arrangement points the first optical sensor and the second optical sensor in substantially a same direction and points the first optical sensor and the third optical sensor in substantially different directions.

* * * * *